Nov. 15, 1938. E. M. AITKEN Re. 20,914

FILE SHARPENING METHOD AND APPARATUS

Original Filed Oct. 20, 1930 3 Sheets-Sheet 1

INVENTOR.
EARLE M. AITKEN
BY Henry N. Young
ATTORNEY

FILE SHARPENING METHOD AND APPARATUS

Original Filed Oct. 20, 1930 3 Sheets-Sheet 2

INVENTOR.
EARLE M. AITKEN.
BY Henry N. Young
ATTORNEY

Nov. 15, 1938. E. M. AITKEN Re. 20,914
FILE SHARPENING METHOD AND APPARATUS
Original Filed Oct. 20, 1930 3 Sheets-Sheet 3
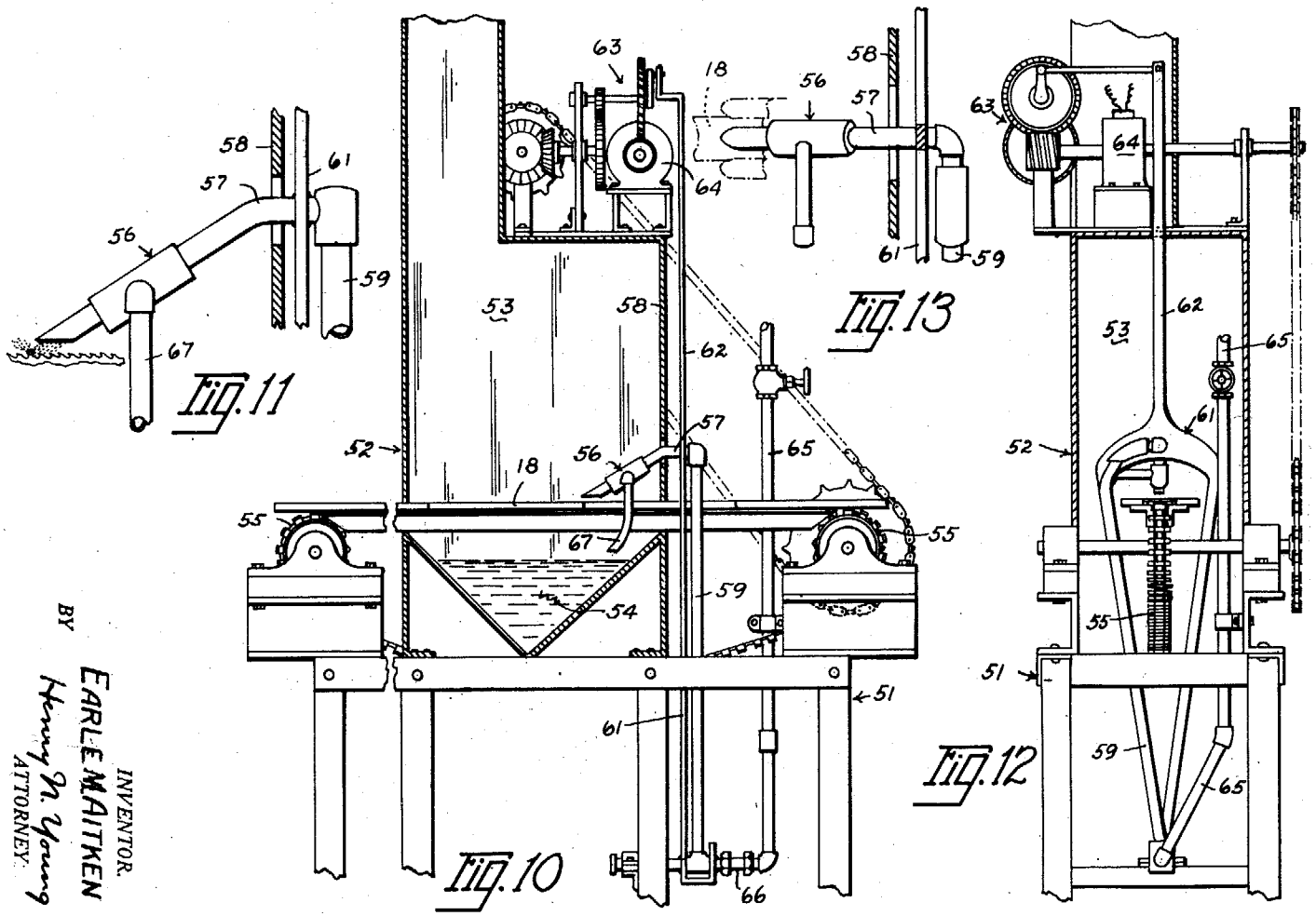
INVENTOR.
EARLE M. AITKEN
BY Henry N. Young
ATTORNEY.

Reissued Nov. 15, 1938 Re. 20,914

UNITED STATES PATENT OFFICE 20,914

FILE SHARPENING METHOD AND APPARATUS

Earle M. Aitken, Saugus, Calif., assignor, by direct and mesne assignments, of one-third to James Catto, Oakland, Calif., one-third to John M. MacPherson, Berkeley, Calif., and one-third to J. R. Wood, Los Angeles, Calif.

Original No. 1,907,196, dated May 2, 1933, Serial No. 489,786, October 20, 1930. Application for reissue July 23, 1935, Serial No. 32,775

13 Claims. (Cl. 51—10)

The present invention relates to a machine for sharpening files and similar cutting tools.

An object of the invention is to provide a continuously operable method for sharpening a continuously moving succession of files and the like by the use of a sand blast.

Another object of the invention is to provide a file sharpening device wherein the cutting edges of the files are formed or restored with a minimum of erosion of the tooth metal.

A further object is to provide uniform and continuous application of the sand blast to assure uniform results in the use of the device.

Another object is to provide means for maintaining mixture in a uniform state of fluidity.

These and the further objects and advantageous features of the invention are hereinafter fully described and illustrated in the accompanying drawings, of which:

Fig. 10 is a side elevation of a somewhat modified form of structure.

Fig. 11 is an enlarged side elevation of the nozzle arrangement of the embodiment of Fig. 10.

Fig. 12 is an end view of the structure of Fig. 10, portions of the structure being broken away, and Fig. 13 is an enlarged plan view of the nozzle structure of Figs. 10 to 12.

Figures 1, 2, 3, 4:
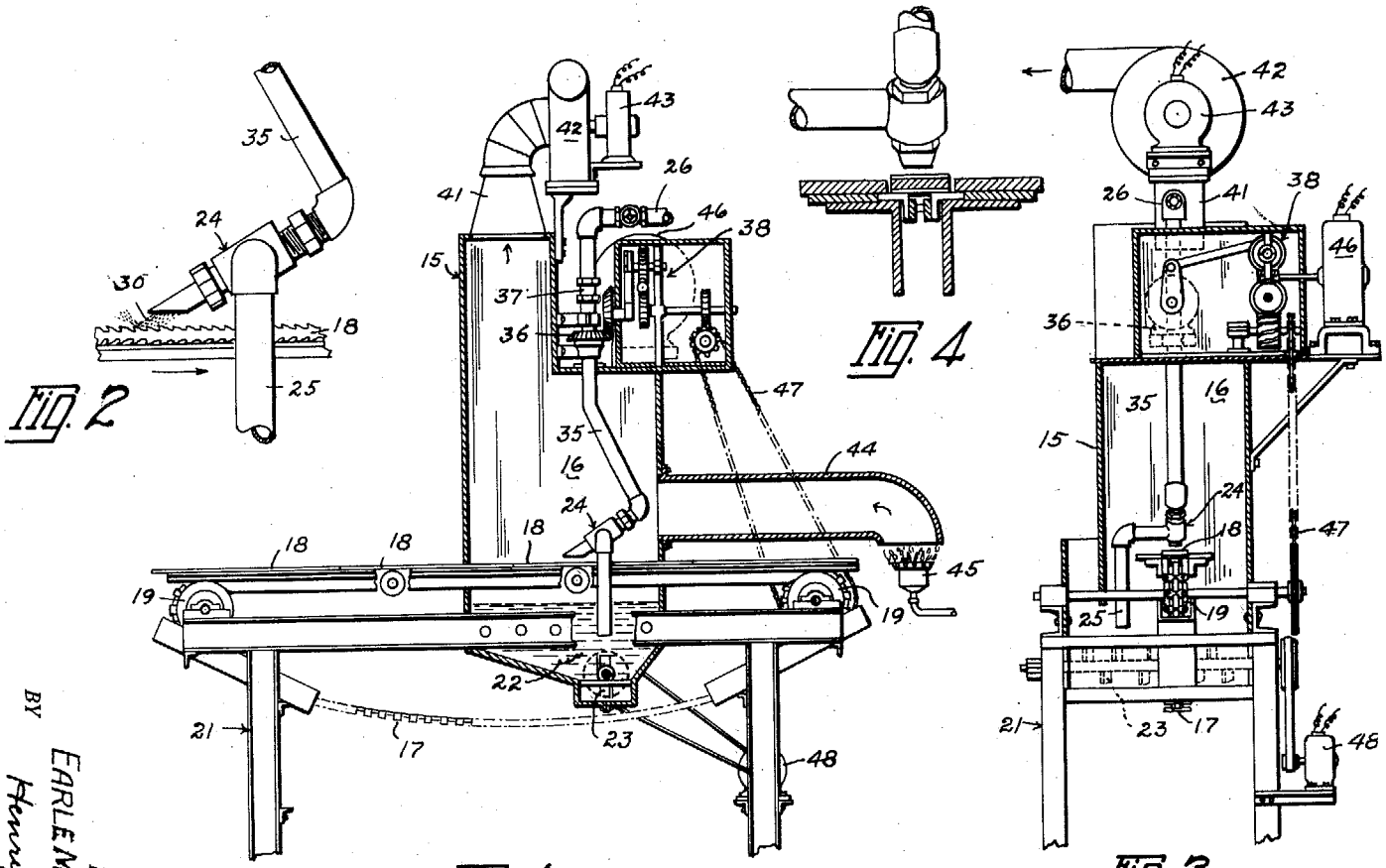
Fig. 1 is a somewhat diagrammatic side elevation of a machine embodying the invention, parts of the machine being broken away to disclose certain interior mechanisms.
Fig. 2 is an enlarged fragmentary elevation of the sand blast nozzle of Fig. 1, particularly showing the shape and relation of the nozzle to the teeth of a passing file.
Fig. 3 is an end elevation, partly in section, of the device of Fig. 1.
Fig. 4 is an enlarged rearward view of the aforenamed nozzle structure.

The invention involves a method of utilizing a sand blast to sharpen or resharpen a toothed tool, such as a file, and it comprises the directing of a sand blast against the teeth in such a manner as to primarily erode the tooth backs in order to produce or restore a cutting edge. The device of the invention is arranged to pass files through the blast at a constant speed, in one direction, and in such relation to the blast that the device may operate continuously.

As illustrated in Figs. 1 to 9, the structure of the invention comprises a casing 15, providing a work chamber 16 through which a chain conveyor 17 is arranged to carry a succession of files 18, placed end to end on the conveyor. This conveyor is carried by and between sprockets 19, mounted at opposite ends of a frame 21, and this frame carries the casing 15 intermediate its ends. The bottom of the casing is shaped to provide a reservoir, or sump for a fluid abradant, the latter comprising an aqueous mixture 22 containing a comminuted abrasive substance and, if desired, suitable material for maintaining the suspended condition of the abrasive particles in the mixture. As shown, a power driven agitator 23 may be provided in the reservoir portion of the casing 15.

Mounted within the chamber 16, above the conveyor, is a sand blast nozzle 24, from which extends a suction pipe 25 into the sump. The nozzle is shown connected to a supply pipe 26, through which steam is forced to draw the mixture 22 from the sump, through the suction pipe 25, into the nozzle, in which it becomes mixed with the steam before it is discharged through the nozzle orifice. The construction of the nozzle will be hereinafter described in detail.

Figures 5, 6, 7, 8, 9:
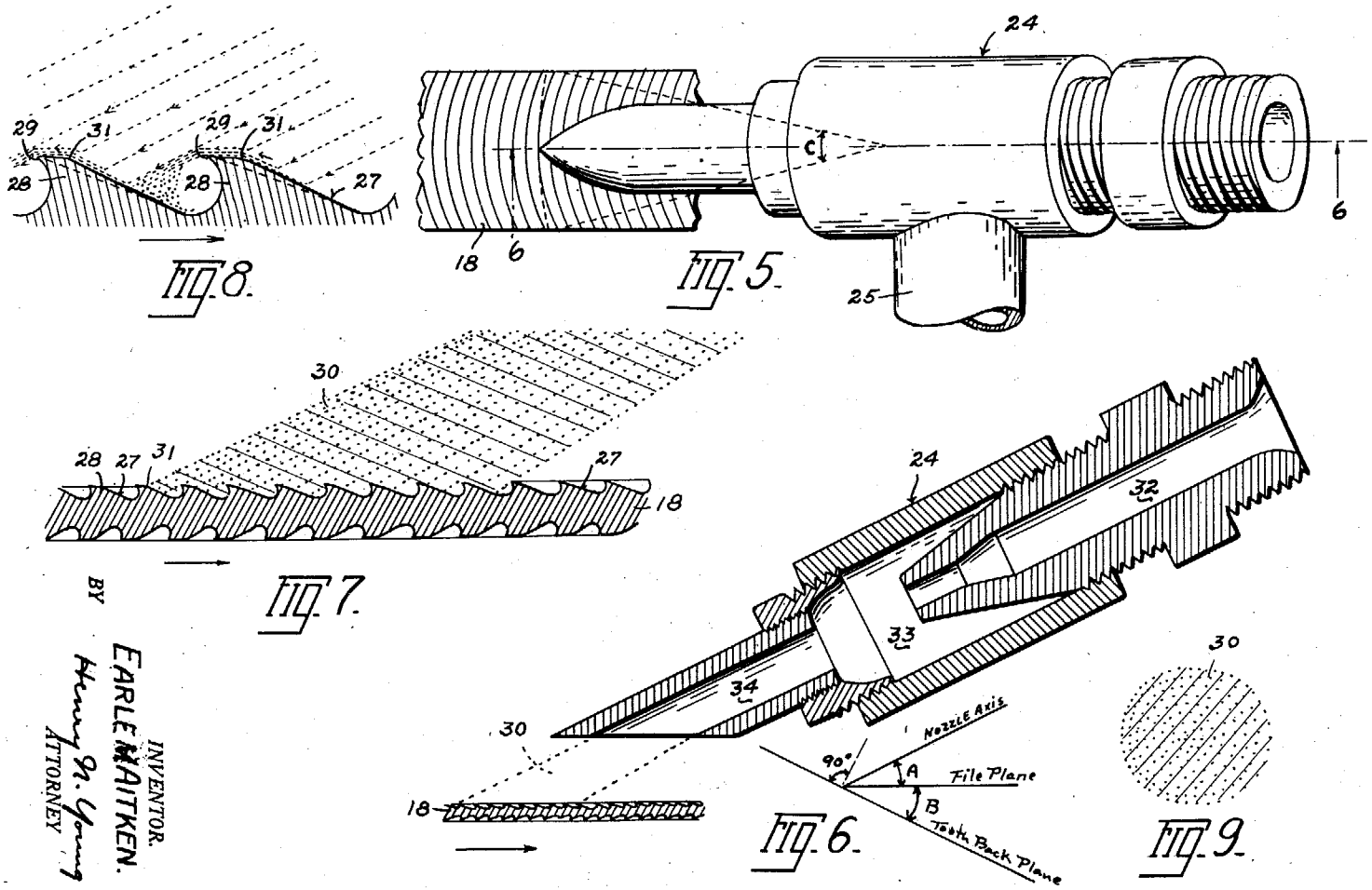
Fig. 5 is a still further enlarged plan view of the nozzle structure.
Fig. 6 is a section taken on line 6—6 of Fig. 5, angular relations of the nozzle to a file being diagrammatically illustrated in connection with this view.
Fig. 7 is an enlarged section through a file and through a sand blast directed against the file.
Fig. 8 is a diagrammatic view substantially illustrating the action of the sand blast against a file.
Fig. 9 represents a cross section through the sand blast stream illustrating the distribution of abrasive particles therein.

Examination of an outworn file discloses that the wear thereon has rounded the backs of the teeth sufficiently to cause the teeth to ride over the work and the cutting edges of the teeth to fail to bite. This condition is particularly brought out in Figs. 7 and 8, wherein the application of the sand blast to a file in accordance with the present invention is illustrated on a large scale. In Fig. 7, a double faced file is shown in section, and this file is shown having worn teeth on its underside while its upper teeth are shown in various stages of repair, depending on their relation to a sand blast stream directed against the upper file side. By reference to these views, it is seen that the abrasive stream 30 strikes the back faces 27 of the file teeth 28 at such an angle that the stream particles are deflected outwardly along said faces for eroding the same. Those particles which have struck the tooth nearest its base are held against the face 27 by the impact of the stream itself, causing the deflected particles to move along and operate against the face 27 throughout its entire area, adjacent the tooth edge 29.

At this point, attention is invited to the shape of the nozzle 24. It is noticed that the cylindrical end of this nozzle is beveled off sufficiently to bring its angular orifice surface close to and in parallel alignment with the face of the file. When the blast nozzle is mounted in such relation to the file, it is to be noted that the particles will tend to crowd beneath the front end of the nozzle, compelling the material to spread transversely and to drop over the side edges of the file. If the nozzle is set too high, it will be found that the abrasive material all flows freely over the cutting edge 29, tending to round off the edge. If, on the other hand, the nozzle is adjusted too close to the file, the material will crowd so solidly under the nozzle as to check the operation of the device. The proper distance between the discharge face of the nozzle and the file should be about one quarter of an inch on the type of file here illustrated, or about four times the depth of the tooth. The inertia of the deflected and working stream carries it sufficiently beyond the edge 29 and over the sides of the file to make sure that the edge 29 is abraded only from its outer face portion, whereby the ultimate wearing away of the back hump 31 of the tooth results in the restoration of the operativeness of the cutting edge with substantially the same working angle as was originally provided.

Preferably, the blast is arranged to strike a number of teeth at once, and the file is moved longitudinally through the blast in the opposite direction to a working traverse of the file, as shown. It is to be understood that this resharpening of the file teeth largely depends on a correct angular relation of the blast axis to the plane of the tooth backs. As particularly illustrated in Fig. 6, the angle between the nozzle axis and the back plane of the teeth approximates fifty degrees, with the acute angle A, defined between the nozzle axis and file plane, approximating twenty five degrees, and the acute angle B, defined between the file plane and the tooth back plane, of substantially the same size as the angle A. In this manner, the angle of incidence of the sand blast to the tooth backs is understood to approximate forty degrees.

Means may be provided whereby a graduated blast action is provided as a tooth moves through the blast zone. Such means is shown to comprise a novel construction of the nozzle 24, whereby the sand blast stream 30, emitted by the nozzle, is of varying density and velocity in cross section, the stream density and velocity being least at the front and rear ends of the nozzle, respectively. As shown in Fig. 6, the axis of the stream inlet passage 32 to the mixing chamber 33, of the nozzle structure, is parallel to and laterally offset from the axis of the nozzle discharge passage 34. By adjusting the one relative to the other, the blast stream consistency may be varied to suit operating conditions. As Fig. 6 is incorporated merely to illustrate the angular relation of the nozzle to the file and the method of offsetting the steam pipe 32, no attention has otherwise been paid, in this view, to the proper proportions and relations of the parts.

The nozzle 24 is connected to be oscillated about a vertical axis to cause the sand blast to sweep a file transversely as the file advances, and it is important to note that this transverse oscillation of the nozzle is sufficient to bring the center line of the nozzle in line with the side edges of the file. This is necessary in order that an equal amount of abrasive mixture may be deposited on every portion of the file tooth back. The nozzle is carried at the lower end of a pipe 35, connecting the nozzle with the steam supply pipe 26, and the pipe 35 extends through an upper casing wall, outside of which it is provided with a bevel gear 36. A swivel joint 37 is provided at the juncture of the pipes 26 and 35, to permit oscillation of the nozzle, it being noted that the axis of swivelling intersects the nozzle intermeditae its ends. The pipe 35 and the nozzle are arranged to be oscillated by means of a suitable power driven mechanism 38, including gearing and a crank shaft, the angle of oscillation, C, (Fig. 5) being of proper magnitude to insure complete lateral traverse of the file by the blast jet during each oscillative movement of the nozzle.

The casing should be as nearly as possible airtight, in order that pressure and humidity conditions may be maintained substantially uniform. As, however, atmospheric temperature and humidity conditions vary with seasons and geographical locations, it is necessary to provide means for maintaining such uniform conditions within the casing. Such means is here conventionally shown to comprise an exhaust fan 42, controlling an air duct 41, leading from the top of the casing and means, such as an electric motor 43, for operating this fan. An air inlet 44 is shown provided at the lower portion of the casing, and means is provided for conditioning the air permitted to enter the casing through this inlet. Such means is conventionally shown as a gas burner 45. The purpose of these instrumentalities is to maintain the abrasive mixture within the sump in a substantially uniform condition of fluidity. A further object is to prevent excessive pressure within the casing, liable to cause damage by explosion or at least to cause the abrasive mixture to splash out through the openings which necessarily must be provided in the casing for carrying the files past the nozzle. But, in actual practice, more elaborate conditioning devices should be provided.

It is now seen that, if the nozzle is set so close to the face of the files, as unduly to delay the flow of the mixture over the file teeth, the pressure within the casing will increase rapidly, not only to cause the mixture to squirt out through every opening, but also to affect the consistency of the mixture in the sump. From this, it is seen that a necessary relation exists between the shape and location of the nozzle and the conditioning of the space within the casing. It is further important to note at this point that the direction of the nozzle permits the portion of the mixture which passes beyond the sides of the file, at the end of each lateral oscillation of the nozzle, to shoot into and to spend its force against the surface of the sump mixture, thereby to maintain the latter violently agitated. For this reason, the agitator 23 is only needed where a very heavy mixture is employed.

The sand blast strikes the files with such force that means must be provided to maintain the files in proper position relative to the blast. Such means is, in the drawings, merely shown to comprise lateral guides for the files, but it is to be understood that, in actual practice, more effective means is provided. Without such, the device could not operate.

An electric motor 46 is mounted on the casing for oscillating the nozzle through the mechanism 38 and simultaneously actuating the conveyor chain 17, through gearing and a sprocket chain 47. The agitator 23 is connected to be driven by an additional motor 48.

The above described mechanism is designed to finish the resharpening of worn out files. Less care is required in roughing out such files, and a somewhat simpler machine may be substituted for this purpose, if so desired. Such machine is illustrated in Figs. 10 to 13 to comprise a frame 51, carrying a casing 52, defining a working chamber 53 provided with a sump for the reception of an abradant mixture 54. A conveyor chain 55 is provided for carrying files through the casing, substantially as in the above described machine. The nozzle 56 may also remain structurally similar to and of the same shape as the nozzle 24, but it is shown differently mounted. The nozzle 56 is shown carried at the end of a steam pipe having a generally horizontal portion 57 extending through an aperture in a casing wall 58 and an upright portion 59 extending downwardly to a point of the frame 51 considerably below the working level of the nozzle. A yoke-shaped frame 61 is pivotally mounted on the frame externally of the casing, and it carries the pipes 58 and 59 for effecting an arcuate oscillation of the nozzle laterally across the files on the conveyor, within the working chamber 53. The nozzle movement is so short on such long radius as to be substantially rectilinear. In practice, the operative relation of the conveyor chain and member is such that a file is moved ahead one tooth at each swing of the nozzle. An arm 62 extends upwardly from the frame 61, and it is connected by means of a crank and gear mechanism 63 with a motor 64, for effecting the desired rocking of the member and nozzle. A steam supply pipe 65 is connected to the pipe 59, through a swivel joint 66 connecting with T portion of the pipe 59, said latter pipe portion comprising the shaft which supports the yoke and nozzle assembly.

The mixture 54 can be considerably more fluid than the finishing mixture 22. For this reason, the suction pipe 67 may not actually extend into the mixture in the sump. Frictional resistance to the nozzle movement is in this manner minimized. As the discharge blast leaving the file is directed to strike and agitate the mixture, the splash of the mixture is found sufficient to keep the suction pipe supplied with abrasive material. But the pipe may, of course, be extended into the mixture, if preferred. In the roughing-out machine, the working angle of the blast jet to the tooth back is preferably a few degrees greater than that used in the finishing machine, whereby a slight preparatory hollow grinding of the tooth is effected.

While the present embodiments of the invention are designed to sharpen and resharpen files having arcuate teeth, the invention is applicable to the sharpening also of files having other forms of teeth. These embodiments are merely illustrative of the invention, and right is reserved to include such further modification as will fall within the scope of the appended claims.

I claim:

1. The method of sharpening a file, which comprises directing a sand blast obliquely against the back faces of a plurality of successive file teeth whereby the deflected sand is directed outwardly along said faces and longitudinally of the file, a section of said sand blast being of progressively varying density longitudinally of the file.

2. In file sharpening apparatus, a nozzle for delivering a sand blast against a file for grinding the back surfaces of the file teeth to restore the cutting edges thereof, said nozzle formed to provide a stream of varying density in its section.

3. In file sharpening apparatus, a nozzle for delivering a sand blast stream obliquely against a back surface of a file tooth whereby the deflected sand is directed outwardly along said back surface, said stream of varying density in its section and being of least density at that portion thereof which first strikes the file.

4. In file sharpening apparatus, means providing a sump for an aqueous mixture containing an abradant material, means for delivering a stream to contain said material comprising a body having a mixing chamber, an inlet duct connecting said sump with said chamber, an inspirator nozzle for discharging a gaseous fluid into said chamber whereby to supply said material thereto from said sump by inspiration, and a discharge nozzle from said chamber, the axis of the nozzle passages being mutually parallel and relatively offset whereby the stream discharged from said discharge nozzle is arranged to be of similar varying density and velocity across its section.

5. The method of sharpening a file, which comprises directing a sand blast obliquely and progresively against the back faces of successive file teeth whereby the deflected sand is directed outwardly along said faces and longitudinally of the file toward one end thereof, a section of said sand blast being of progressively varying density longitudinally of the file and the relative movement of the file and blast being effected solely in one direction and at an unvarying speed.

6. The method of sharpening files which comprises directing a sand blast obliquely against the back face of the file teeth by means of a nozzle having its beveled end surface set close to and parallel with the surface of the file, whereby the stream deflected is evenly directed and spread over said faces toward the edges of the teeth, and simultaneously effecting a continuous longitudinal movement of a succession of files past said sand blast in the direction opposite to that of the sand blast.

7. The method of sharpening files which comprises directing a sand blast obliquely against the back faces of the file teeth by means of a nozzle having its beveled end surface set close to and parallel with the surface of the file, whereby the stream of deflected sand is directed to spread evenly over said faces, simultaneously advancing the files in continuous succession longitudinally past said sand blast in the opposite direction to the deflected sand stream, and simultaneously oscillating said sand blast laterally across the files.

8. In a file sharpening machine, a continuously advancing file support, a nozzle positioned to direct a sand blast obliquely against the backs of adjacent teeth of files on said support the end of said nozzle having a beveled edge set close to and parallel with the surface of the files to be sharpened, thereby to deflect the sand of the blast evenly over said faces, means for maintaining the files in position on said support, and means for oscillating said nozzle laterally of the files on said support.

9. In a file sharpening machine, a nozzle for delivering a sand blast, and a conveyor for supporting and longitudinally moving files through the stream of said blast in a direction contrary to the longitudinal working stroke of the file, said nozzle being positioned to direct the sand blast obliquely against the back surfaces of the file teeth to deflect the sand evenly over said teeth for eroding the back surfaces thereof to restore the cutting edge of the teeth, means for oscillating said nozzle transversely of the files, and a sump beneath said nozzle, the nozzle being positioned to direct the stream falling beyond the sides of the files into said sump to agitate the sand blast mixture therein.

10. In a file sharpening machine, a casing provided at the bottom with a sand blast mixture sump, an endless horizontal conveyor having its upper reach passing through said casing, a nozzle within the casing, means for spraying the mixture from said sump through said nozzle and obliquely against the back surfaces of the teeth, and means for maintaining uniform pressure and humidity conditions within the casing.

11. In a file sharpening device, means for continuously carrying a succession of files longitudinally through the device, a cylindrical nozzle obliquely positioned relative to and close to the faces of said files and having its end beveled to present its beveled discharge surface parallel to the file faces, means for discharging a sand blast through said nozzle against the back surfaces of the file teeth, and means for oscillating said nozzle transversely of the files.

12. In a file sharpening machine, a casing, means for supporting files to be sharpened within the casing, a reservoir in the casing for an abrading mixture, means within the casing for spraying mixture from said reservoir evenly against the back surfaces of the file teeth, and means for maintaining uniform pressure and humidity conditions within the casing.

13. In a file sharpening machine, a casing, means for supporting files to be sharpened within the casing, a reservoir within the casing for an abrading mixture, means within the casing for spraying mixture from said reservoir evenly against the back faces of the file teeth, said means being positioned and operated to direct surplus mixture against the surface of said reservoir mixture violently to agitate the mixture.

EARLE M. AITKEN.